(No Model.)

B. SCHUMM.
APPARATUS FOR PREPARING AND MANIPULATING FERMENTING MIXTURES.

No. 514,340. Patented Feb. 6, 1894.

WITNESSES:
William Miller
Chas. E. Svenegen

INVENTOR:
Bleichard Schumm
BY
Hauff & Hauff
ATTORNEYS.

THE NATIONAL LITHOGRAPHING COMPANY,
WASHINGTON, D. C.

UNITED STATES PATENT OFFICE.

BLEICHARD SCHUMM, OF NEW YORK, N. Y.

APPARATUS FOR PREPARING AND MANIPULATING FERMENTING MIXTURES.

SPECIFICATION forming part of Letters Patent No. 514,340, dated February 6, 1894.

Application filed October 5, 1893. Serial No. 487,251. (No model.)

*To all whom it may concern:*

Be it known that I, BLEICHARD SCHUMM, a citizen of the United States, residing at New York, in the county and State of New York, have invented new and useful Improvements in Apparatus for Preparing and Manipulating Fermenting Mixtures, of which the following is a specification.

This invention has for its object to provide a new and improved apparatus for preparing and manipulating a fermenting mixture, whereby deteriorated yeast, such as that taken from the vessels in which beer is fermented, can be sterilized and rendered fit for the purpose of producing the fermentation of fresh beer wort.

To accomplish this object my invention consists in the features of construction and the combination and arrangement of parts hereinafter described and claimed, reference being made to the accompanying drawings, in which—

Figure 1:
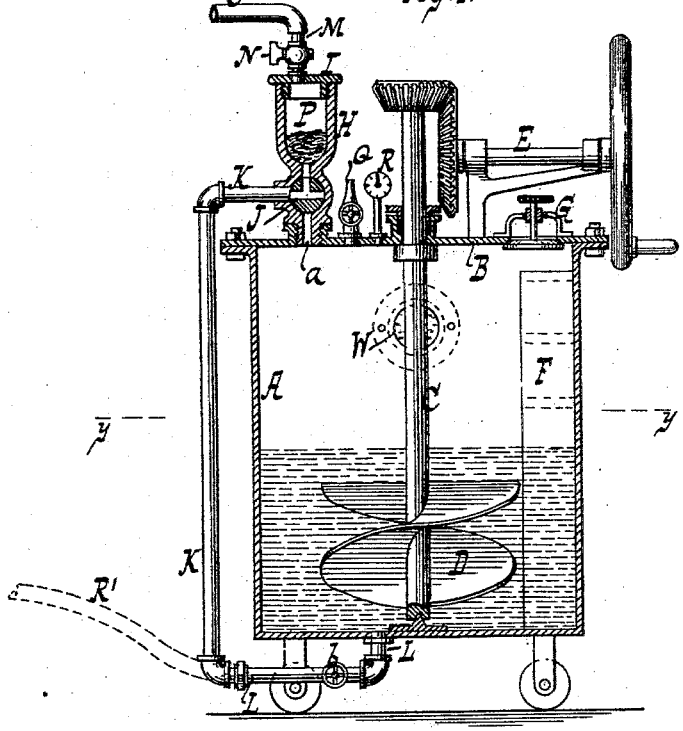
Figure 2:
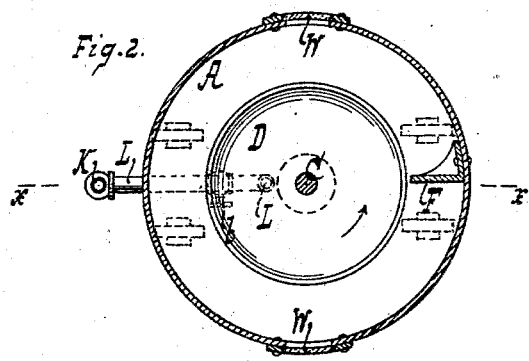

Figure 1 is a vertical sectional view taken on the line $x$—$x$, Fig. 2, showing my improved apparatus. Fig. 2 is a horizontal section in the plane $y$ $y$ Fig. 1.

In the drawings the letter A designates a tank made of steel plates or any other suitable material of sufficient strength and provided with a cover B which is firmly secured in position by screws or other suitable fastenings. In the center of this tank is mounted a vertical shaft C which carries an agitator D and which is geared with a horizontal shaft E, so that a rapid revolving motion can be imparted to it by hand or any other suitable power. On one side of this tank is firmly secured a plate F which extends inward close to the circumference of the agitator for the purpose of facilitating the operation of mixing the substances placed into the tank. A manhole G gives access to the interior of the tank. During the operation of mixing this manhole is firmly closed by well known means.

On the cover B are firmly secured a pressure regulating cock Q, a pressure gage R and a cup H which can be firmly closed by a removable cover I and which communicates with the top part of the tank by a channel $a$, the communication being controlled by a threeway cock J. From the shell of this cock extends a pipe K which can be connected with a pipe L leading into the bottom of the tank A beneath the agitator D. This pipe is provided with a stop-cock $b$. In the cover I of the cup H is firmly secured a pipe M, provided with a stop-cock N and the pipe M communicates by means of a pipe or hose O with an air forcing apparatus or with a reservoir containing air under a pressure from fifteen to twenty pounds to the square inch (not shown in the drawings). The cup H is charged with an absorbent substance P such as cotton waste or loose felt which may be saturated with a solution of a substance for sterilizing the air such as a solution of salicylic acid in alcohol. The tank A is provided with one or more transparent plates W through which its contents can be inspected and it is charged with a mixture of deteriorated yeast and fresh, unfermented beer wort, then the agitator D is set in motion and atmospheric air under pressure is admitted into the cup H through the pipe M, while the threeway-cock J is turned to the position shown in Fig. 1 and the stopcock $b$ in the pipe L is opened. By the action of the agitator D the yeast and wort become intimately mixed and by opening the cock Q a current of air under pressure is introduced through the pipes K and L at the bottom of the tank A beneath the agitator D. By the action of the agitator the mixture of beer wort and yeast is thrown against the abutment F so that the lumps of yeast are broken up and the mixture is rapidly worked up into a foam and the air which passes into the tank beneath the agitator is uniformly distributed throughout the mass of foam, so that it comes in intimate contact with the particles of yeast contained in the foam and the yeast becomes sterilized in a short time and fit to be introduced into the fermenting vats. When this stage is reached, the motion of the agitator is stopped, the cocks Q and $b$ are closed and the threeway-cock J is turned so as to open the communication between the cup H and the top part of the tank A through the channel $a$, whereby the finished mixture is exposed to the action of compressed air from above. The stop-cock $b$ being closed, the pipe K is detached from the pipe L and connection is made between the pipe L and a hose R' which is intended to convey the finished mixture from the tank A into the fermenting vats.

The stop-cock *b* is then opened and the finished mixture is forced out through the hose R' by the pressure of the air introduced into the tank A through the pipe O, cup H and channel *a*.

By means of the cock Q the pressure of the air in the tank A can be regulated and I have found that by maintaining the pressure at from five to ten pounds per square inch, the oxygen of the air acts quicker and with greater intensity upon the yeast than it does at the ordinary atmospheric pressure and the pressure can be easily regulated by manipulating the cock Q and observing the gage R.

What I claim as new, and desire to secure by Letters Patent, is—

A mixing apparatus consisting of a closed tank A, an agitator in the interior of this tank and means for imparting motion to this agitator, an opening in the bottom of the tank beneath the agitator, a closed cup H secured to the cover of the tank and communicating with the top part of said tank through a channel *a*, pipes K, L forming a communication between the cup and the opening in the bottom of the tank, a pipe M for introducing air under pressure into the cup H and a threeway-cock J for controlling the communications between the cup and the top and bottom parts of the tank substantially as described.

In testimony whereof I have hereunto set my hand in the presence of two subscribing witnesses.

BLEICHARD SCHUMM.

Witnesses:
  W. HAUFF,
  E. F. KASTENHUBER.